Dec. 17, 1929.  J. TURNER  1,739,995
FRUIT CUTTING AND PITTING MACHINE
Filed Dec. 24, 1927  3 Sheets-Sheet 2
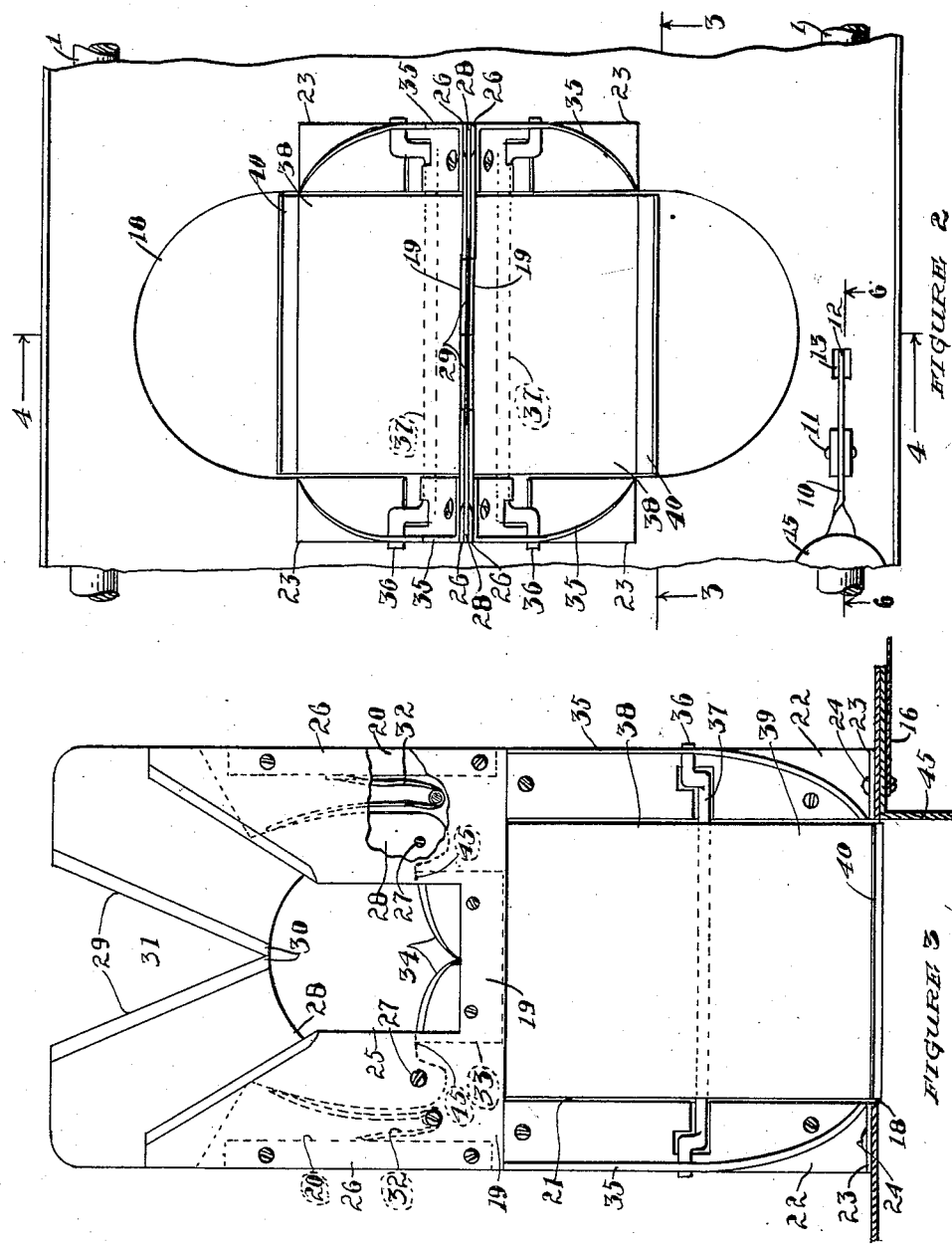

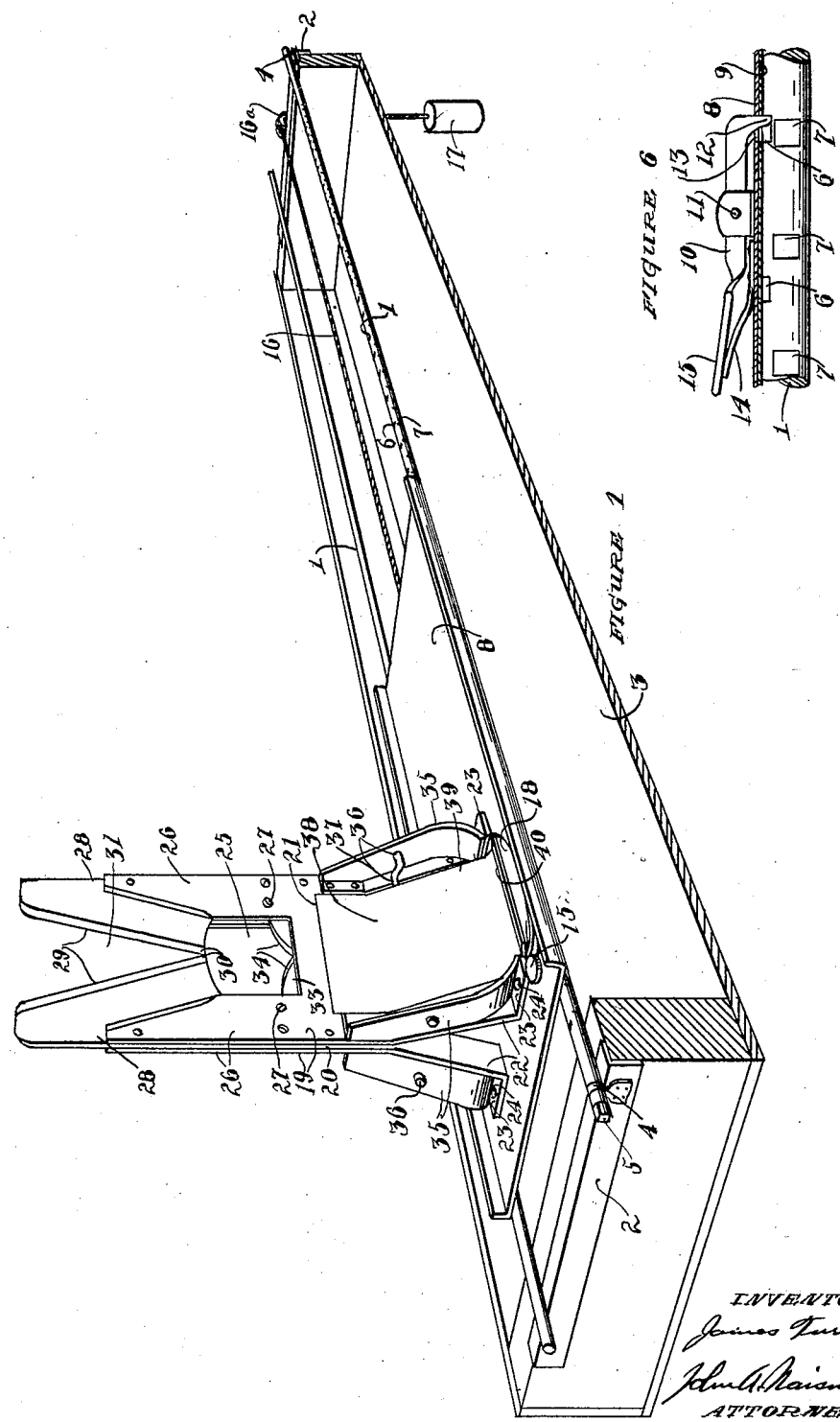

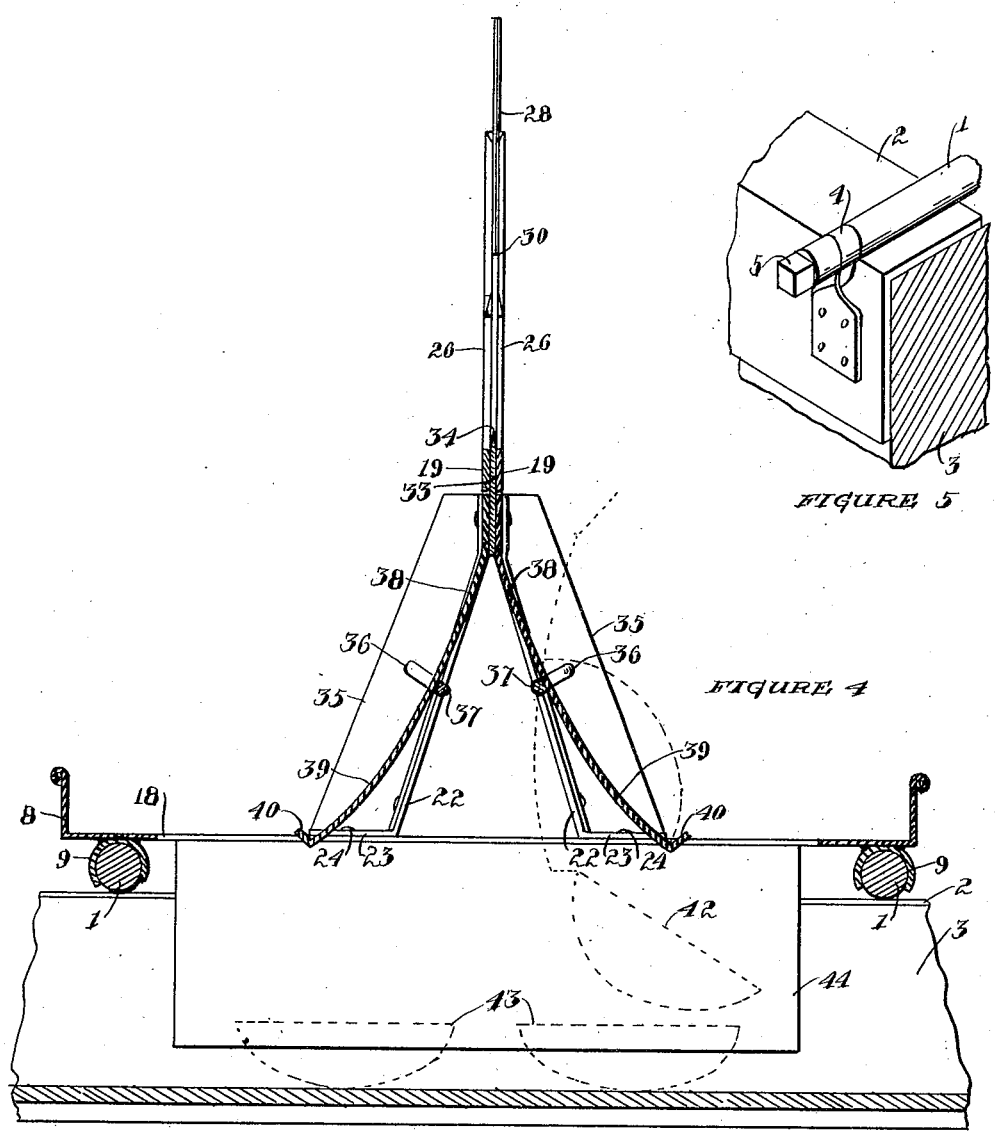

Patented Dec. 17, 1929

1,739,995

UNITED STATES PATENT OFFICE

JAMES TURNER, OF CAMPBELL, CALIFORNIA

FRUIT CUTTING AND PITTING MACHINE

Application filed December 24, 1927. Serial No. 242,321.

This invention relates particularly to a machine for cutting fruit, such as fresh apricots, into two parts, removing the pits therefrom, and depositing the two parts in an inverted position upon a drying tray.

It is one object of the invention to provide a machine whereby the cutting, pitting and positioning of the parts of the cut fruit may be effected in the one operation.

It is another object of the invention to provide a machine of the character indicated that may be adjustably mounted upon a drying tray and that may in itself be adjusted to space the cut fruit portions as desired and to meet the varying requirements of various sized fruit.

It is also an object of the invention to provide a machine of the character indicated that will be simple in form, economical to manufacture, and highly efficient in its practical application.

In the drawing:

Figure 1 is a perspective view of a machine embodying my invention in position on a portion of a tray.

Figure 2 is a plan view of the machine, part broken away.

Figure 3 is a section on 3—3 of Figure 2.

Figure 4 is a section on 4—4 of Figure 2.

Figure 5 is an isometric perspective view of a portion of the adjusting mechanism.

Figure 6 is a section on line 6—6 of Figure 2.

Referring now more particularly to the drawing, I show at 1—1 a pair of spaced parallel rods, and at 2—2 are shown a pair of angle irons upon which the rods 1 are mounted, the irons 2 being arranged in spaced and parallel relation to each other, and in opposed relation to each other as shown whereby to slidably engage the outer upper edges of the two sides of a drying tray as shown, the drying tray being shown in part at 3. One of the rods 1 is fixedly mounted upon its supports 2, but the other rod is revolubly mounted in bearings 4, one on each iron 2, and is provided with a means as 5 whereby it may be rotated a distance in its bearings when desired. This rotatable rod has a plurality of spaced notches formed therein as at 6 and substantially throughout its length. These notches are aligned along one side of the rod, while another row of spaced notches as 7 are formed in the rod in spaced angular relation to the first mentioned row, the spacing of the notches in one row being different from the spacing of the notches in the other row.

At 8 I show a tray having guideways 9 mounted on its under side and adapted to engage and slide freely upon the rods 1—1. A detent 10 is pivotally mounted on the tray 8 as at 11, and so positioned that one end as 12 will pass through an opening 13 in the tray 8 and engage a notch in the rod 1 thereunder. The detent is normally held in engagement with a notch by a suitable spring as 14, and is fitted with a finger-piece 15. A cable 16 is attached to the tray 8 and carried forwardly over a pulley 16ª mounted on the front iron 2 where it is fitted with a weight 17.

When the structure above described is mounted upon a drying tray as shown in Figure 1, the tray 8 is held in position by the engagement of the detent 10 with a notch 6. When the detent is momentarily released by pressure upon the finger-piece 15 the weight 17 quickly pulls the tray forwardly until the detent engages the next succeeding notch 10, and in this manner the tray is moved forwardly over the whole width of the drying tray in steps of equal length. If the spacing of the stops is not suitable, then the rod 1 may be rotated a distance so the detent will operate in a row of notches having a less or greater spacing as desired.

In the tray 8 and near one end thereof adjacent the detent 10 is formed an opening 18 extending cross-wise of the tray. Bridging this opening is a structure comprising a pair of plates 19 spaced by bars 20 lying in the vertical plane bisecting the tray 8 longitudinally. Each plate 19 has an opening 21 formed in its lower portion, its lower side portions forming angularly extending legs 22 provided with feet 23 secured to the tray 8 at 24. In each plate 19, and centered above the opening 21, is formed an opening 25, the upper side portions of the plate extending upwardly a distance to form arms 26.

Between each pair of adjoining arms 19 is pivotally mounted, as at 27, a knife 28. Each knife has the heel 30 of its cutting edge 29 normally advanced to a point lying in the vertical axis of the structure, the cutting edge sloping upwardly and outwardly therefrom as shown so that the opposing cutting edges of the two knives will form a V shaped opening as shown at 31. These knives are normally held in the position described by suitable springs as shown at 32. Inserted between the plates 19 at the bottom of opening 25 is a member 33 provided with converging cutting edges 34 as shown.

On the opposing legs 22 of each plate 19 are mounted opposing brackets 35, and in these brackets is journaled a rock-shaft 36 having an eccentric portion 37 lying below and rearwardly of the normal shaft axis. On this shaft is mounted a plate 38 substantially filling the opening 21 and having its upper portion lying in the plane of the plate 19 thereover, and having its lower portion directed downwardly and outwardly a distance as shown at 39 in Figure 4, and terminating in an upwardly turned lip 40. This plate 38 is so constructed, arranged and balanced that when a section of fruit slides down upon it the said fruit is stopped by engagement with the lip 40, but the weight of the fruit swings the plate into the position shown in dotted lines at 41 thereby causing the fruit itself to become overbalanced so that it will fall off of the plate as indicated at 42 and drop upon the bottom of the tray 3 with the cut side up as indicated at 43.

Assuming the machine to be assembled in complete working condition as above set forth, with the rods 1 mounted on a drying tray and with the tray 8 positioned close to the edge of the tray 3 adjacent the operator, the operator takes an apricot and centers it over the cutting edges 29 of the knives 28 and then draws it downwardly thereon. As the knives cut through the flesh of the apricot the heel portions 30 contact with and follow around the pit therein, thereby cutting the apricot into two parts. As the apricot is moved on downwardly the knife edge 34 cuts apart the extreme end of the apricot that might not have been reached by the knives 28, especially the harder portion at the stem end of the apricot when this end is presented first in the cutting as it should be, and as the severed halves of the apricot are moved on past the edges 34 the pit is held back through its engagement with knife edges 34 and falls to one side. The two halves of the apricot are now released by the operator and they slide down the plates 38 and are deposited side by side on the drying tray as described. The detent 10 is now operated by a touch of a finger and the tray 8 moved forward automatically to the next position for operating. In this manner the apricots may be quickly halved and pitted and the cut halves uniformly distributed in rows over the drying tray.

An apron is hung cross-wise of the tray 8 and depending from its under side just forwardly of the opening 18 to prevent the cut portions of fruit from rolling forwardly when they drop upon the tray, this apron being shown at 44. The blades 28 are so formed as to contact with member 33 as at 45 whereby to hold them in the desired position with their heels in the position shown.

It is to be understood, of course, that while I have shown herein but one specific embodiment of the invention, changes in form, construction, and method of assembly and operation may be made within the scope of the appended claims.

I claim:

1. In combination, supporting means, a tray shiftably mounted thereon, fruit arranging and depositing means mounted on the tray to deposit the fruit in a predetermined position therebelow, means for advancing the tray on the supporting means, and means inserted between the tray and supporting means to control the advance of the tray.

2. In combination with a drying tray, a support mounted thereover and shiftable relative thereto, a tray mounted on the support and shiftable relative thereto, tray shifting mechanism connected to the second mentioned tray, releasable means for interrupting the movement of the tray on the support at predetermined intervals, and fruit arranging and depositing means mounted on the second mentioned tray.

3. In combination with a drying tray, a support mounted thereover and shiftable relative thereto, a tray mounted on the support and shiftable relative thereto, tray shifting mechanism connected to the second mentioned tray, a plurality of sets of spaced stops distributed along the support in the path of travel of the second tray, a detent mounted on the tray and engageable with the stops, means for shifting either set of stops into the path of travel of the detent, and fruit arranging and depositing means mounted on the second mentioned tray.

4. In combination, a drying tray, a fruit cutting device mounted thereover and adapted to cut the fruit into two parts, and overbalanced swingable plates mounted below the cutting device to receive the cut fruit therefrom, the said plates being rendered operative by the weight of the fruit.

5. In combination, supporting means, a fruit cutting device mounted thereon with its cutting edges in a vertical plane, and a plate pivotally mounted below the cutting device on each side thereof, each plate having its upper edge in substantial alignment with the said device and provided with a stop below its pivotal mounting whereby to receive a fruit portion and be pivotally moved by the weight of the fruit.

6. In combination, supporting means, a fruit cutting device mounted thereon with its cutting edges in a vertical plane, a rock-shaft mounted on each side of the device a distance below the cutting edges and parallel with the plane of the said edges, a plate mounted on each rock-shaft with its upper edge normally lying adjacent the plane of said edges and parallel therewith, the lower edge of each plate extending outwardly a distance below the rock-shaft and provided with a stop.

7. In combination, supporting means, a pair of fruit cutting blades mounted thereon in a vertical plane with angularly positioned opposed cutting edges, the said blades being pivotally mounted and provided with means for normally holding them in close relation to each other, a secondary cutter mounted below the first blades and lying in the plane thereof, and automatically operated means mounted below the secondary cutter blades to receive the cut fruit and invert the same.

8. In combination, supporting means, a pair of oppositely acting and opposed fruit cutting blades pivotally mounted thereon with the lower ends of their cutting edges meeting at a common point and with said edges sloping upwardly and outwardly from said point, resilient means for normally holding said blades in said position, pit removing means positioned below the blades and in the plane thereof, and fruit inverting means inserted below the pit removing means.

9. In combination, a support, a fruit cutting device mounted thereon, and overbalanced swingable plates mounted below the cutting device to receive the cut fruit therefrom, the said plates being rendered operative by the weight of the fruit.

10. In a device of the character described, a fruit inverting means comprising a support, an upstanding plate pivotally and eccentrically mounted thereon, and means to direct a fruit section on to the plate, said plate being provided with a stop below its pivotal mounting whereby to receive a fruit portion and be pivotally moved by the weight of the fruit.

11. A fruit inverting device comprising a support, a rock-shaft journaled therein having an eccentric portion lying below and to one side of the journaled portion, an upstanding plate mounted on the eccentric shaft portion, and means for directing a fruit section on to said plate, the said plate being provided with a stop below the rock-shaft whereby to receive a fruit section and be pivotally moved by the weight of the fruit.

12. In combination, a support, a pair of opposed and resiliently mounted fruit cutting blades mounted thereon, and provided with angularly positioned opposed cutting edges meeting at one end, a pit engaging device mounted in the plane of the blades and in the path of travel of fruit passing thereover, and means mounted adjacent the pit engaging device to receive the cut fruit and invert the same.

13. In combination with a drying tray, a support mounted thereover and shiftable relative thereto, a tray mounted on the support and shiftable relative thereto, and fruit cutting and pitting means mounted on the second tray and provided with means to deposit the cut fruit on the first tray.

JAMES TURNER.